United States Patent
Zhou

(10) Patent No.: US 10,876,279 B2
(45) Date of Patent: Dec. 29, 2020

(54) WASH BASIN DRAIN

(71) Applicant: Zhejiang Delifu Technology Co., Ltd., Ningbo (CN)

(72) Inventor: Pingan Zhou, Ningbo (CN)

(73) Assignee: ZHEJIANG DELIFU TECHNOLOGY CO., LTD., Ningbo (CN)

( * ) Notice: Subject to any disclaimer, the term of this patent is extended or adjusted under 35 U.S.C. 154(b) by 114 days.

(21) Appl. No.: 15/346,086

(22) Filed: Nov. 8, 2016

(65) Prior Publication Data

US 2017/0260723 A1 Sep. 14, 2017

(30) Foreign Application Priority Data

Mar. 11, 2016 (CN) .................. 2016 2 0191407 U

(51) Int. Cl.
*E03C 1/23* (2006.01)
*A47K 1/14* (2006.01)
*F16L 33/24* (2006.01)
*E03C 1/14* (2006.01)

(52) U.S. Cl.
CPC .............. *E03C 1/23* (2013.01); *A47K 1/14* (2013.01); *E03C 1/2306* (2013.01); *F16L 33/24* (2013.01); *E03C 1/14* (2013.01); *E03C 2001/2317* (2013.01); *E03C 2201/00* (2013.01)

(58) Field of Classification Search
CPC .... A47K 1/14; E03C 1/14; E03C 1/23; E03C 2001/00; E03C 2001/2317; F16L 33/24
USPC ............................................. 4/287–288, 668
See application file for complete search history.

(56) References Cited

U.S. PATENT DOCUMENTS

| | | | | | |
|---|---|---|---|---|---|
| 1,511,017 | A | * | 10/1924 | Binder | E03C 1/262 4/287 |
| 2,736,577 | A | * | 2/1956 | Mackey | E03C 1/262 285/139.3 |
| 2,858,989 | A | * | 11/1958 | Jordan | E03C 1/262 241/46.015 |
| 3,445,867 | A | * | 5/1969 | Loffler | E03C 1/22 4/288 |
| 3,509,586 | A | * | 5/1970 | Politz | E03C 1/26 4/286 |
| 3,711,874 | A | * | 1/1973 | Gajer | A47K 1/14 4/287 |
| 4,984,309 | A | * | 1/1991 | Lowry | E03C 1/22 4/288 |
| 5,297,817 | A | * | 3/1994 | Hodges | F16L 23/024 285/109 |

* cited by examiner

*Primary Examiner* — Lauren A Crane

(74) *Attorney, Agent, or Firm* — Bayramoglu Law Offices LLC

(57) ABSTRACT

The embodiments disclosed herein provide an adjustable wash basin drain wherein a fitting angle of the contact surfaces between the wash basin and the drain can be adjusted to achieve a better seal between the wash basin and the drain. The wash basin drain may include a split-type drain flange that includes an upper connector seat, a lower connector seat, and a flange connector. The upper connector seat is configured to snap fit to an upper end of a water discharge hole of the wash basin. The lower connector seat is connected to a water discharge pipe, and may be disposed beyond a bottom end of the wash basin. The flange connector connects the upper connector seat with the lower connector seat.

6 Claims, 3 Drawing Sheets

WASH BASIN DRAIN

CROSS REFERENCE TO RELATED APPLICATIONS

This application claims priority to co-pending and commonly owned Chinese Patent Application No. 201620191407.1 filed on Mar. 11, 2016, the entirety of which is hereby incorporated by reference.

TECHNICAL FIELD

The present utility model relates to the technical field of sanitary appliance accessories, in particular to a wash basin drain.

BACKGROUND OF RELATED ART

A drain, for example, a wash basin drain, may be used for connecting sanitary appliances (e.g., in a kitchen or a bathroom) to a water discharge pipe system. A conventional wash basin drain comprises a stopper, a drain flange and a flange connector seat. For example, Chinese patent publication number CN202170550U discloses "a drain" comprising a drain pipe, a nut screwed onto the drain pipe, a drain main body connected to the nut, a locking nut, a gasket, a washer, and a sealing ring sealing cover, which are arranged on the drain main body from bottom to top. The drain includes an upper cover which can be inserted into the drain main body, and a bounce body, a bounce seat, a compression spring, a bounce spring and a spring arranged under the bounce seat, which are connected to the upper cover. The drain further includes a filter screen is arranged in the drain main body.

Since wash basins are often formed using ceramic materials, the flatness of the bottom surface of the wash basin (e.g., where the drain is typically installed) may be limited by manufacturing tolerances. For example, the drain is typically installed by inserting the drain main body into an installation hole, locking the locking nut to the threads of the drain main body under the wash basin, and sealing the area between the locking nut and the bottom surface of the wash basin using a seal ring. Thus, any unevenness in the bottom surface of the wash basin may prevent the locking nut from being micro-adjusted. This may result in a poor seal and/or water leakage between the drain and the wash basin.

Further, the diameter of the locking nut under the drain main body is relatively large. Thus, during installation, large-size pliers may be needed to properly fasten the locking nut in place. However, such large pliers may be inconvenient for installation personnel to carry and operate due to their large size and heavy weight.

Some wash basin drains may include a filter element structure. Wash basin drains with filter element structures may require different stoppers than wash basin drains without such filter element structures. However, conventional wash basin drains may only support one type of stopper. In other words, drains that include filter element structures typically do not have interchangeable parts with drains that do not include such filter element structures, resulting in high maintenance and/or replacement costs.

SUMMARY

The embodiments disclosed herein provide an adjustable wash basin drain wherein a fitting angle of the contact surfaces between the wash basin and the drain can be adjusted to achieve a better seal between the wash basin and the drain.

In some embodiments, the wash basin drain comprises a stopper, a drain flange, a water discharge pipe and a seal. The drain flange is connected to a water discharge hole of a corresponding wash basin, the stopper is connected to an upper end of the drain flange, and the water discharge pipe is connected to a lower end of the drain flange. The drain flange includes an upper connector seat, a flange connector, and a lower connector seat, which are of a split type. The upper connector seat is snap fitted to an upper end of the water discharge hole of the wash basin, an upper end of the flange connector is connected to a lower end of the upper connector seat, a lower end of the flange connector is fastened to the lower connector seat via screws. The lower connector seat is disposed outside a bottom end of the water discharge hole of the wash basin, and the water discharge pipe is connected to a lower end of the lower connector seat.

The upper end of the flange connector may be connected to the upper connector seat via external threads. The lower end of the flange connector may include a bottom plate with an internal threaded hole. A peripheral wall of the bottom plate may be connected to the upper end of the flange connector with the external threads via a plurality of connecting plates uniformly distributed along an outer circumference of the bottom plate, wherein each connecting plate is provided with a step hole configured to receive a screw (specifically, the head of the screw).

The lower connector seat may comprise a body with a collar. An upper surface of the collar may be snap fitted to the seal and may be in contact with a bottom surface of the wash basin. A plurality of lugs may be uniformly distributed along an inner circumference of the body of the lower connector seat, wherein each lug is provided with a threaded hole configured to receive a screw.

For some embodiments, the flange connector may include three connecting plates and the lower connector seat may include three corresponding lugs. Each connecting plate may be fastened to a corresponding lug using a screw.

An annular protruding strip may protrude from an outer edge of the collar. The seal may include an annular groove that mates with the annular protruding strip on the outer edge of the collar. The seal may bulge outwards, opposite the annular groove, to form an arc surface. The arc surface may be in contact with the bottom surface of the wash basin to form a seal.

The water discharge pipe may comprise a gasket and a locking nut, wherein the gasket is disposed in the locking nut and is under the lower connector seat. The lower end of the lower connector seat may be provided with external threads. One end of the locking nut may be threaded into the lower connector seat, and the other end of the locking nut may form a baffle plate with a center through hole. An upper end of the water discharge pipe may form a folding edge that is folded outwards. The water discharge pipe may be inserted into the central through hole of the baffle plate such that the folding edge is secured between the baffle plate and the gasket.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

The example embodiments are described below in detail with reference to the accompanying drawings. In the following description and for purposes of explanation, specific nomenclature is set forth to provide a thorough understanding of the example embodiments. However, it will be apparent to one skilled in the art that these specific details may not be required to practice the example embodiments. Numerous specific details are set forth such as examples of specific components and/or processes to provide a thorough understanding of the present disclosure.

Figure 1:
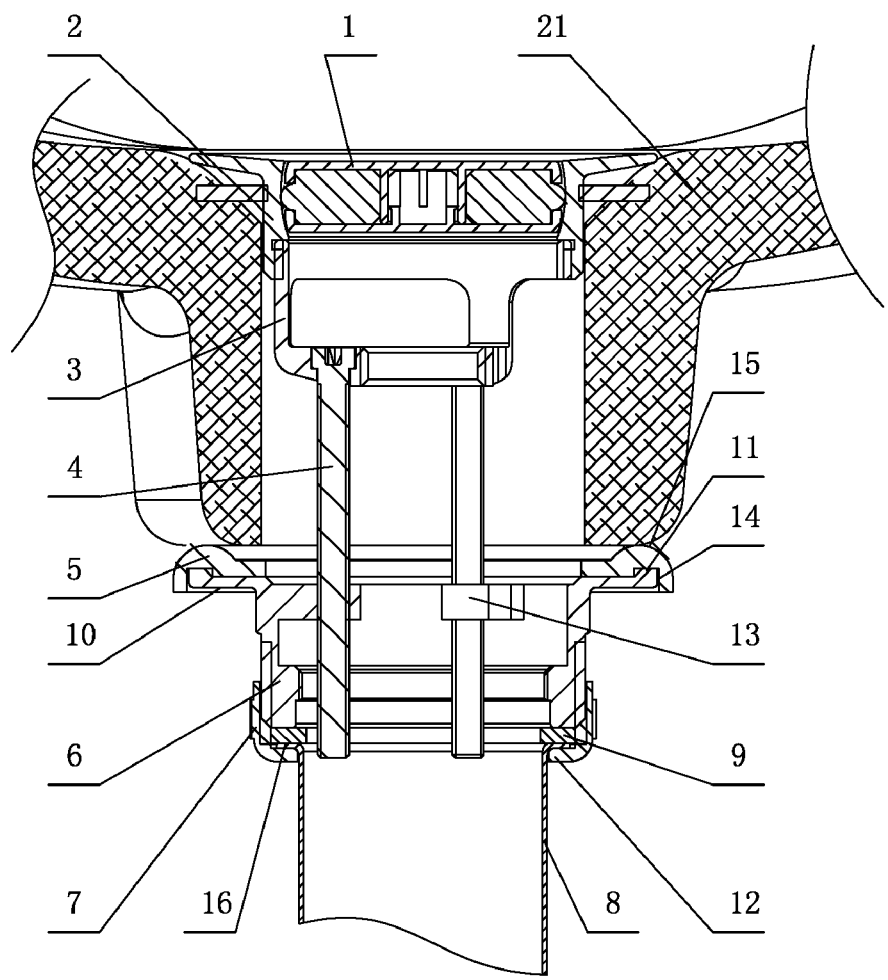
FIG. 1 is a structural schematic diagram of a wash basin drain, applicable to a flap-type stopper, in accordance with example embodiments.
Figure 2:
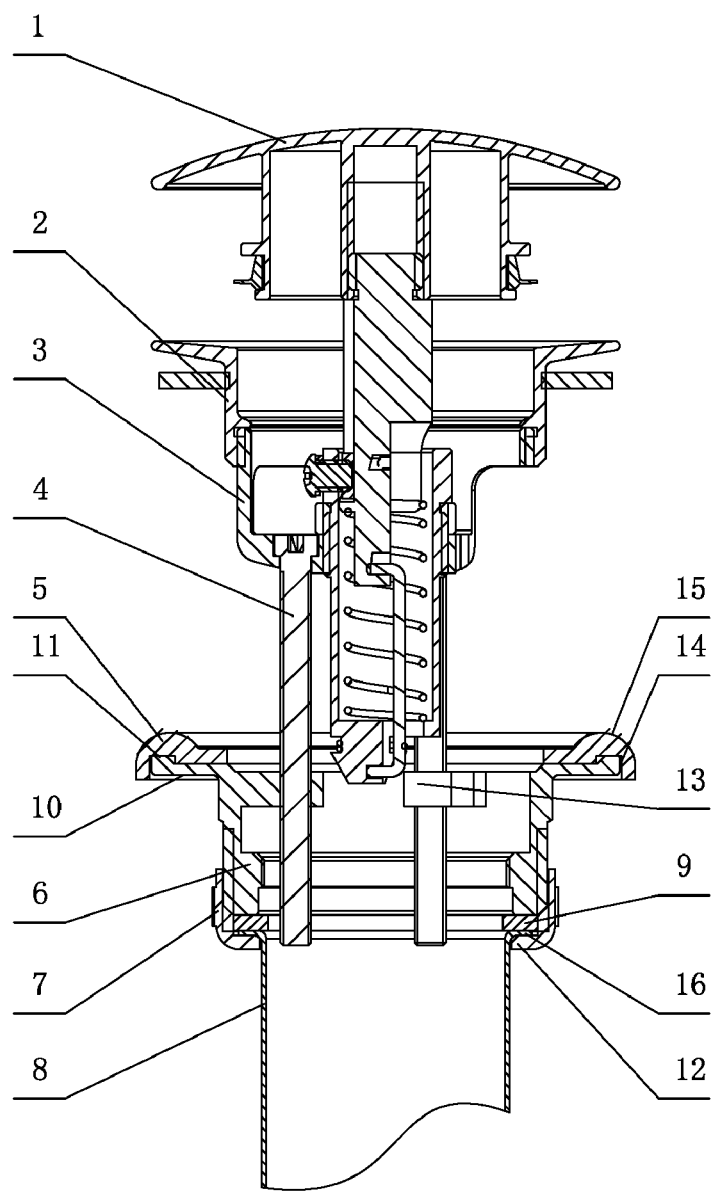
FIG. 2 is a structural schematic diagram of the wash basin drain, applicable to a bounce-type stopper, in accordance with example embodiments.
Figure 3:
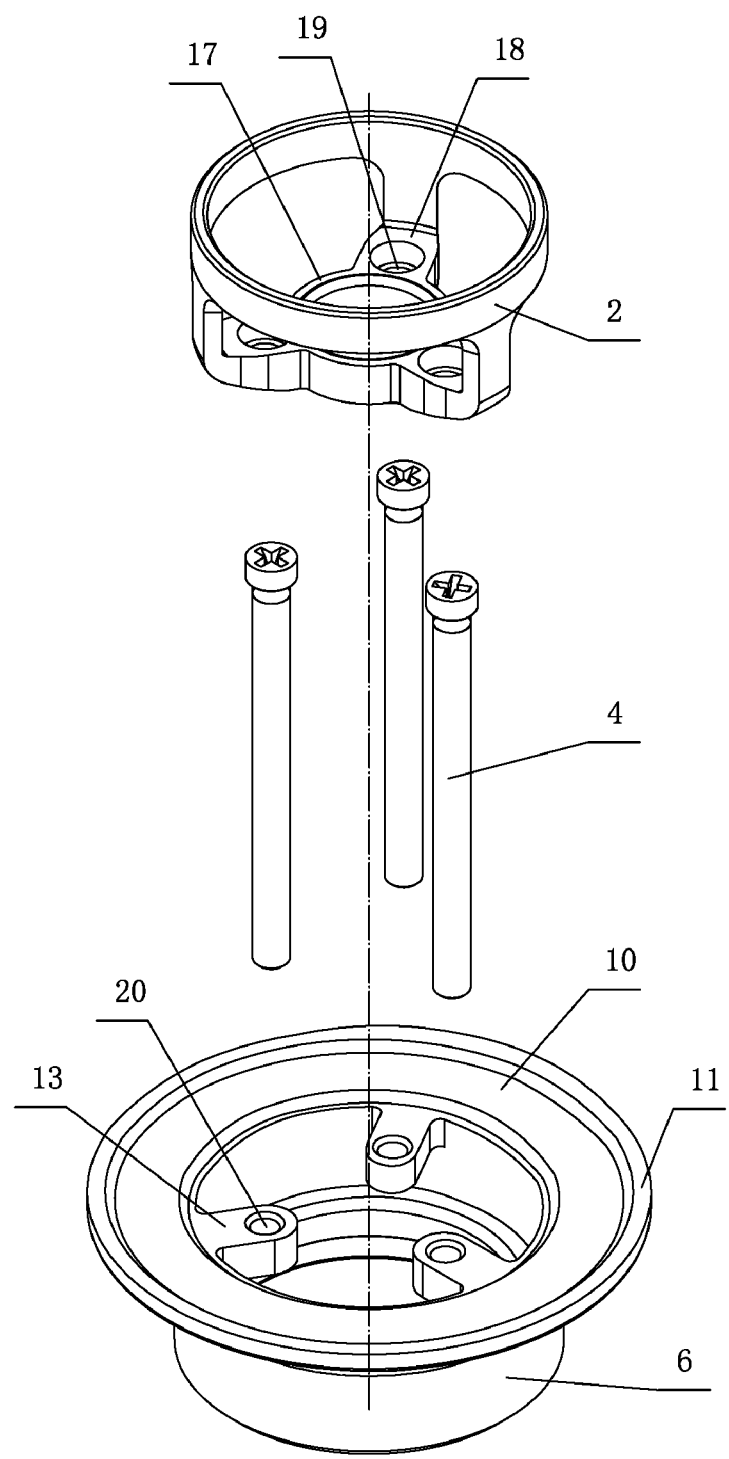
FIG. 3 is an exploded structural schematic diagram of a drain flange in accordance with example embodiments.

From the structural schematic diagram of a wash basin drain of the example embodiments shown in FIGS. 1-3, the wash basin drain comprises a stopper 1, a "split-type" drain flange (comprising an upper connector seat 2, a flange connector 3, and a lower connector seat 6), a water discharge pipe 8 and a sealing element, wherein the drain flange is connected to a water discharge hole of a wash basin 21, the stopper 1 is connected to the upper end of the drain flange, and the water discharge pipe 8 is connected to the lower end of the drain flange. The upper connector seat 2 "snap" fits to the upper end of the water discharge hole of the wash basin. The upper end of the flange connector 3 is connected to the lower end of the upper connector seat 2. The lower end of the flange connector 3 may be fastened to the lower connector seat 6 using screws 4. The lower connector seat 6 is disposed outside the bottom end of the water discharge hole of the wash basin. The water discharge pipe 8 is connected to the lower end of the lower connector seat 6.

In the example of FIG. 1, the stopper 1A may be a flap-type drain structure without a filter element structure. In the example of FIG. 2, the stopper 1B may be a bounce-type drain structure with a filter element structure. It can be seen from FIGS. 1 and 2 that, aside from the filter element and the stopper, the other elements of the wash basin may identical. Accordingly, the stoppers 1A and 1B (e.g., and corresponding filter elements) may be interchangeable within the same wash basin. For example, a user may easily convert from a flap-type drain structure to a bounce-type drain structure, or vice-versa, by simply changing out the stopper 1A or 1B.

The upper end of the flange connector 3 includes external threads for connecting to the upper connector seat 2. The lower end of the flange connector 3 forms a bottom plate 17 with a hole in the center. The edge of the peripheral wall of the bottom plate 17 is connected to the upper portion of the flange connector 3 via a plurality of connecting plates 18 that are uniformly distributed along an outer circumference of the bottom plate 17. Each connecting plate 18 includes a step hole 19 configured to receive a screw 4 (specifically, the large head of the screw).

The lower connector seat 6 comprises a body with a collar 10 at the upper end. The upper end surface of the collar 10 snap fits to a seal 5, which is in close contact with the bottom surface of the wash basin 21. A plurality of lugs 13 are uniformly distributed along an inner circumference of the lower connector seat 6 (e.g., on the inner side wall of the body), and each lug 13 includes a threaded hole 20 configured to receive one of the screws 4.

For some embodiments, the flange connector 3 may include three connecting plates 18 and the lower connector seat 6 may include three corresponding lugs 13. Each connecting plate 18 may be fastened to a corresponding lug 13 using one of the screws 4. For example, each screw 4 may be threaded through a step hole 19 (e.g., of a respective connecting plate 18) and threaded hole 20 (e.g., of a respective lug 13).

An annular protruding strip 11 protrudes from the outer edge of the collar 10. The seal may include an annular groove 14 that mates with the annular protruding strip 11 on the outer edge of the collar 10. The seal 5 may bulge outwards, opposite the annular groove 14, to form an arc surface 15. The arc surface 15 may be in close contact with the bottom surface of the wash basin 21 to form a tight seal.

The water discharge pipe 8 may comprise a gasket 9 and a locking nut 7, wherein the gasket 9 is disposed in the locking nut 7 and is below the lower connector seat 6. The lower end of the lower connector seat 6 may be provided with external threads. One end of the locking nut 7 may be threaded into the lower connector seat 6, and the other end of the locking nut 7 may form a baffle plate 12 with a center through hole. The upper end of the water discharge pipe 8 may form a folding edge 16 that is folded or turned outwards. The water discharge pipe 8 may be inserted into the center through hole of the baffle plate 12 such that the folding edge 16 is locked or secured between the baffle plate 12 and the gasket 9.

The wash basin drain of the example embodiments may be installed as follows: All components are first connected to form two assemblies (e.g., an upper connector seat assembly and a lower connector seat assembly), according to the position of the water discharge hole of the wash basin 21; the upper connector seat assembly may then be inserted into the water discharge hole of the wash basin 21; the lower connector seat assembly may be disposed on the outer end surface of the bottom of the wash basin 21; the screws may be threaded through the step holes 19 on the flange connector 3 to the threaded holes 20 on the lower connector seat 6; and after micro-adjustment, the lower connector seat assembly may be firmly fastened to the upper connector seat assembly and the wash basin 21.

The wash basin drain of the example embodiments may offer the following advantages over conventional wash basin drains:

The drain flange is configured as a "split type" flange structure (e.g., formed by the upper connector seat 2, the flange connector 3, and the lower connector seat 6) and the flange connector is connected to the lower connector seat via screws, such that during installation, the upper connector seat 2 may be fastened to the lower connector seat 6 using only a screwdriver. Therefore, on one hand, a portion of materials of the drain body in the water discharge hole of the wash basin in the prior art is saved, thereby reduce the cost. On the other hand, even if the bottom surface of the wash basin is uneven, micro-adjustments can be carried out by adjusting the tightness of the screws 4 in the lower connector seat 6 to create a better seal between the wash basin 21 and the drain, and thereby prevent water leakage.

The lower connector seat 6 may be connected to the flange connector 3 without the use of large-size pliers. For example, the installation of the wash basin drain can be completed using only a screwdriver, which may be much more convenient for installation personnel to carry and operate.

The wash basin drain uses the same flange connector and lower connector seat structure, regardless of whether the drain includes a filter element or not. In the example embodiments, only the stopper needs to be replaced (e.g., instead of replacing the entire drain) when adding or removing a filter element. Due to the interchangeability of parts, the wash basin drain disclosed herein may reduce maintenance and replacement costs.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A wash basin drain for a water discharge pipe comprising:
   a drain flange having an upper connector seat, a flange connector and a lower connector seat;
   a water discharge pipe; and
   a sealing element,
   wherein the upper connector seat comprises a ring shaped body having an interior, and an upper end of the flange connector comprises three downwardly extending elements symmetrically spaced on the ring shaped body, each element has a terminal connecting plate that extends toward the interior of the ring shaped body with a step hole for receiving a screw formed therein, each connecting plate is connected in symmetrical fashion, respectively, to a ring shaped bottom plate that is concentric with the ring shaped body of the upper connector seat thus supporting the ring shaped bottom plate in the interior of the upper connector seat.

2. The wash basin drain of claim 1, wherein the lower connector seat comprises a ring shaped body having a collar that defines an interior, the collar has a substantially flat surface, three lugs are symmetrically spaced on an inner circumference of the collar, each lug extends horizontally relative to the surface toward the interior of the ring shaped body and has a hole for receiving a screw formed therein.

3. The wash basin drain of claim 1, wherein a stopper is removably secured to an upper end of the drain flange, and the water discharge pipe is removably secured to a lower end of the drain flange.

4. The wash basin drain of claim 2, wherein the collar of the lower connector seat has an upstanding annular strip and the sealing element has an annular groove for receiving the annular strip to removably secure the lower connector seat to the sealing element.

5. The wash basin drain of claim 3, wherein the water discharge pipe further comprises a locking nut, and a gasket, the gasket is disposed on the locking nut and is under the lower connector seat, a lower end of the lower connector seat has external threads, one end of the locking nut is threaded into the lower connector seat, and the other end of the locking nut forms a baffle plate having a center through hole, an upper end of the water discharge pipe forms a folding edge that is folded outwards, the water discharge pipe is inserted into a central through hole of the baffle plate such that the folding edge is secured between the baffle plate and the gasket.

6. The wash basin drain of claim 4, wherein a stopper is removably secured to an upper end of the drain flange, and the water discharge pipe is removably secured to a lower end of the drain flange.

* * * * *